United States Patent
Wu (10) Patent No.: US 10,667,170 B2
(45) Date of Patent: May 26, 2020

(54) DEVICE AND METHOD OF HANDLING BUFFER STATUS REPORTING FOR PACKET DUPLICATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/927,096

(22) Filed: Mar. 21, 2018

(65) Prior Publication Data

US 2018/0279163 A1  Sep. 27, 2018

Related U.S. Application Data (60) Provisional application No. 62/474,601, filed on Mar. 21, 2017, provisional application No. 62/523,750, filed on Jun. 22, 2017.

(51) Int. Cl.
*H04W 28/02* (2009.01)
*H04W 76/15* (2018.01)
(Continued)

(52) U.S. Cl.
CPC ... *H04W 28/0278* (2013.01); *H04W 28/0252* (2013.01); *H04W 72/1284* (2013.01);
(Continued)

(58) Field of Classification Search
None
See application file for complete search history.

(56) References Cited

U.S. PATENT DOCUMENTS

| 8,305,901 B2 | 11/2012 | Wu |
| 2012/0093128 A1* | 4/2012 | Song ................. H04W 36/0077 370/331 |

(Continued)

FOREIGN PATENT DOCUMENTS

| EP | 2858441 A1 | 4/2015 |
| EP | 3089540 A2 | 11/2016 |
| EP | 3089540 A3 | 1/2017 |

OTHER PUBLICATIONS

Office action dated Jan. 23, 2019 for the Taiwan application No. 107109681, filing date Mar. 21, 2018, p. 1-8.

(Continued)

*Primary Examiner* — Hong S Cho
(74) *Attorney, Agent, or Firm* — Winston Hsu (57) ABSTRACT

A base station (BS) for handling buffer status reporting comprises a storage device and a processing circuit coupled to the storage device. The storage device stores, and the processing circuit is configured to execute instructions of: configuring a radio bearer (RB) and configuring a first logical channel (LC) and a second LC associated to the RB, to a communication device; configuring the communication device to report separate buffer statuses for the first LC and the second LC associated to the RB; receiving a first buffer status comprising a volume of data associated to the first LC and a second buffer status comprising a volume of data associated to the second LC, from the communication device; transmitting a first UL grant to the communication device according to the first buffer status; and transmitting a second UL grant to the communication device according to the second buffer status.

11 Claims, 9 Drawing Sheets

(51) Int. Cl.
*H04W 72/12* (2009.01)
*H04W 72/14* (2009.01)
*H04W 72/04* (2009.01)
*H04W 76/14* (2018.01)

(52) U.S. Cl.
CPC ........... *H04W 72/14* (2013.01); *H04W 76/14* (2018.02); *H04W 76/15* (2018.02); *H04W 72/0413* (2013.01)

(56) References Cited

U.S. PATENT DOCUMENTS

| | | | | |
|---|---|---|---|---|
| 2015/0098322 A1* | 4/2015 | Chen | ................. | H04W 72/0413 370/230 |
| 2015/0327115 A1* | 11/2015 | Park | ..................... | H04W 76/15 370/328 |
| 2015/0327116 A1* | 11/2015 | Zhang | ............... | H04W 72/1284 370/329 |
| 2015/0334737 A1* | 11/2015 | Susitaival | ......... | H04W 72/1284 370/329 |
| 2016/0029245 A1 | 1/2016 | Hong | | |
| 2016/0066328 A1* | 3/2016 | Hu | .................... | H04W 72/1284 370/329 |
| 2016/0100430 A1* | 4/2016 | Dabeer | ............. | H04W 28/0278 370/329 |
| 2017/0118766 A1* | 4/2017 | Baek | ................. | H04W 72/1268 |
| 2017/0201904 A1* | 7/2017 | Lee | ................... | H04W 28/0263 |
| 2018/0206147 A1* | 7/2018 | Lee | ................... | H04W 28/0278 |

OTHER PUBLICATIONS

Search Report dated Jul. 6, 2018 for EP application No. 18163023.7, pp. 14.
3GPP TS 36.321 V14.1.0 (Dec. 2016) Technical Specification 3rd Generation Partnership Project; Technical Specification Group Radio Access Network; Evolved Universal Terrestrial Radio Access (E-UTRA); Medium Access Control (MAC) protocol specification (Release 14).
3GPP TS 36.323 V14.1.0 (Dec. 2016) Technical Specification 3rd Generation Partnership Project; Technical Specification Group Radio Access Network; Evolved Universal Terrestrial Radio Access (E-UTRA); Packet Data Convergence Protocol (PDCP) specification (Release 14).
3GPP TR 38.804 V1.0.0 (Mar. 2017) Technical Report 3rd Generation Partnership Project; Technical Specification Group Radio Access Network; Study on New Radio Access Technology; Radio Interface Protocol Aspects (Release 14).

* cited by examiner

DEVICE AND METHOD OF HANDLING BUFFER STATUS REPORTING FOR PACKET DUPLICATION

CROSS REFERENCE TO RELATED APPLICATIONS

This application claims the benefits of U.S. Provisional Applications No. 62/474,601 filed on Mar. 21, 2017 and No. 62/523,750 filed on Jun. 22, 2017, which are incorporated herein by reference.

BACKGROUND OF THE INVENTION

1. Field of the Invention

The present invention relates to a device and a method used in a wireless communication system, and more particularly, to a device and a method of handling buffer status reporting for packet duplication.

2. Description of the Prior Art

A fifth generation (5G) (or called new radio (NR)) system provides higher data rate and lower latency for data transmission than those of a long-term evolution (LTE) system. In the 5G system or the LTE system, a radio access network (RAN) in the LTE system includes at least one base station (BS) for communicating with at least one user equipment (UE) and for communicating with a core network. The core network may be responsible for a mobility management and a Quality of Service (QoS) control of the at least one UE.

SUMMARY OF THE INVENTION

The present invention therefore provides a communication device and method for handling buffer status reporting for packet duplication to solve the abovementioned problem.

A base station (BS) for handling buffer status reporting for data duplication comprises a storage device and a processing circuit coupled to the storage device. The storage device stores, and the processing circuit is configured to execute instructions of: configuring a radio bearer (RB) and configuring a first logical channel (LC) and a second LC associated to the RB, to a communication device; configuring the communication device to report separate buffer statuses for the first LC and the second LC associated to the RB; receiving a first buffer status comprising a volume of data associated to the first LC and a second buffer status comprising a volume of data associated to the second LC, from the communication device; transmitting a first UL grant to the communication device according to the first buffer status; and transmitting a second UL grant to the communication device according to the second buffer status.

A communication device for handling buffer status reporting for data duplication comprises a storage device and a processing circuit coupled to the storage device. The storage device stores, and the processing circuit is configured to execute instructions of: being configured a first radio bearer (RB) and being configured a first logical channel (LC) and a second LC associated to the first RB, by a first base station (BS); being configured to report separate buffer statuses for the first LC and the second LC; transmitting a first buffer status comprising a volume of data associated to the first LC and a second buffer status comprising a volume of data associated to the second LC, to the first BS; receiving a first UL grant from the first BS, wherein the first BS transmits the first UL grant according to the first buffer status; and receiving a second UL grant from the first BS, wherein the first BS transmits the second UL grant to the communication device according to the second buffer status.

A base station (BS) for handling buffer status reporting for data duplication comprises a storage device and a processing circuit coupled to the storage device. The storage device stores, and the processing circuit is configured to execute instructions of: configuring a radio bearer (RB) and configuring a first logical channel (LC) and a second LC associated to the RB, to a communication device; configuring the communication device to report a first buffer status for the first LC and configuring the communication device not to report a second buffer status for the second LC; receiving the first buffer status comprising a volume of data associated to the first LC, from the communication device; transmitting a first UL grant to the communication device according to the first buffer status; and transmitting a second UL grant to the communication device according to the first buffer status.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
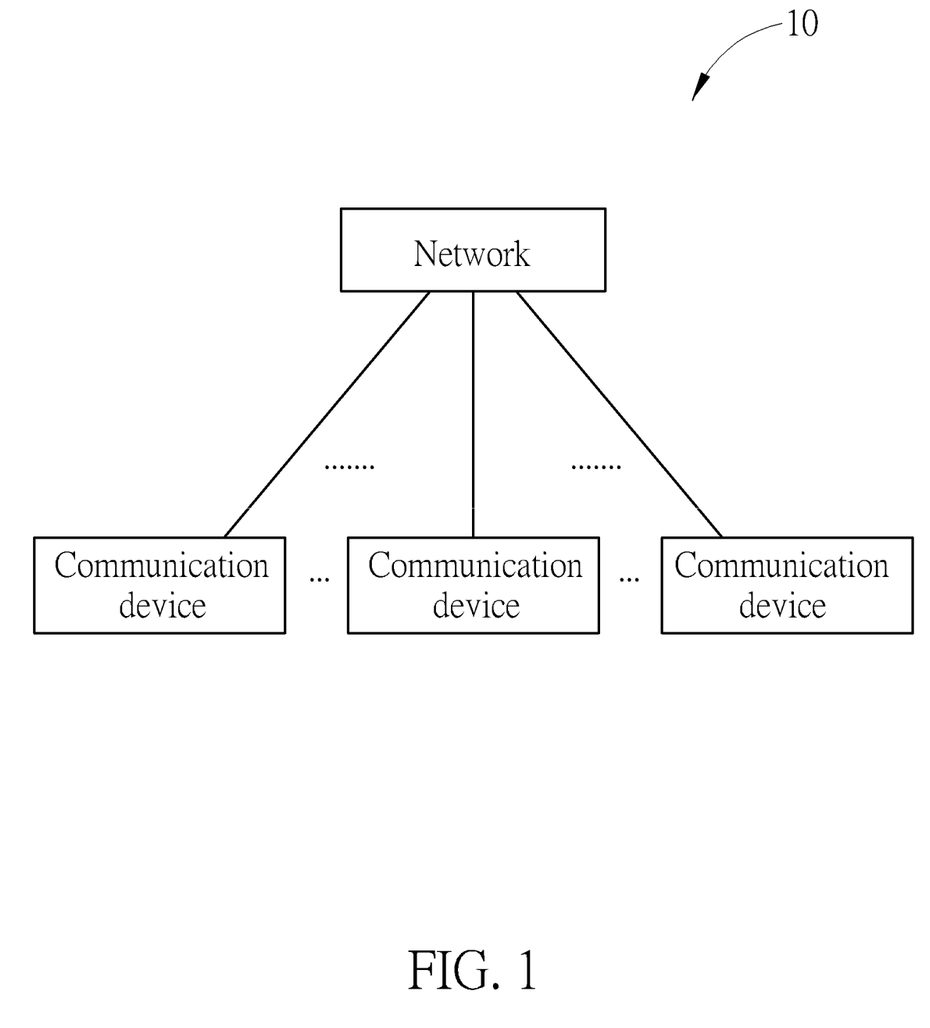
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be an evolved universal terrestrial radio access network (E-UTRAN) or next generation radio access network (NG-RAN) employing orthogonal frequency-division multiplexing (OFDM) and/or non-OFDM for communicating with the communication device.

The communication device may aggregate multiple component carriers (CCs) in a time division duplex (TDD) mode and/or a frequency division duplex (FDD) mode, to communicate with the network in the same frequency band or different frequency bands, when carrier aggregation (CA) or dual connectivity (DC) is supported. A cell may be configured with an uplink (UL) CC and a downlink (DL) CC. If the cell is a FDD cell, the UL CC(s) and the DL CC(s) may have different physical frequencies (e.g., carrier frequencies). If the cell is a TDD cell, the UL CC(s) and the DL CC(s) are the same CC(s).

A communication device may be a user equipment (UE), a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for a UL, the communication device is the transmitter and the network is the receiver, and for a DL, the network is the transmitter and the communication device is the receiver.

Figure 2:
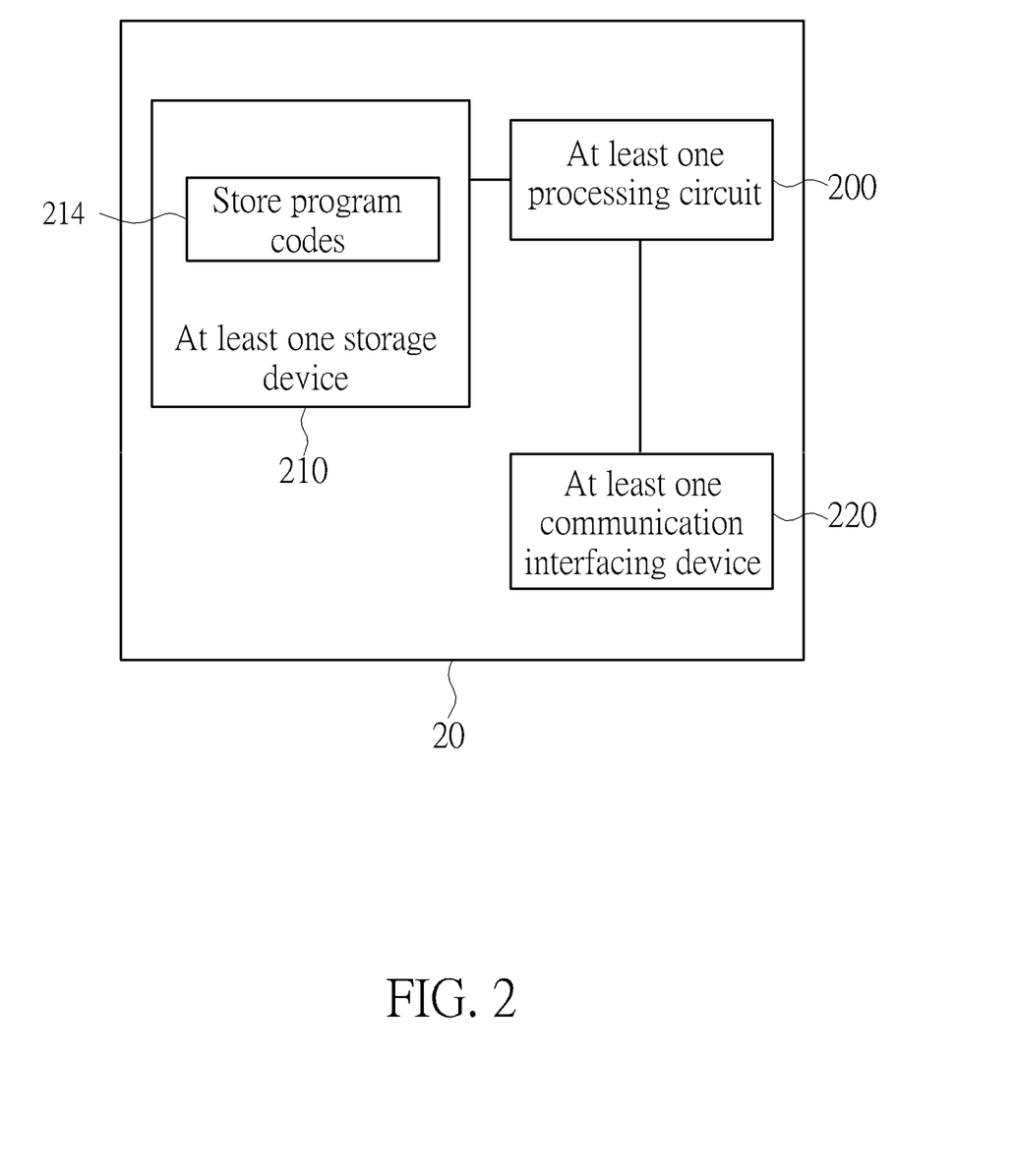
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

In the following examples, a UE is used to represent a communication device in FIG. 1, to simplify the illustration of the embodiments.

A buffer status report (BSR) transmitted by a UE to the network (e.g., RAN) carries information regarding how much data available for transmission is in a buffer associated to a medium access control (MAC) entity in the UE, i.e., buffer status. Then, the network may allocate a UL grant (e.g., resources for a physical UL shared channel (PUSCH)) to the UE according to the buffer status.

A buffer status reporting (BSR) procedure is used for providing the BSR to a serving evolved Node-B (eNB).

Packet duplication (or data duplication) is going to be supported in the E-UTRAN or the NG-RAN, where a transmitter (e.g., the UE or the network) transmits a packet at least twice to improve reception reliability. In this situation, a receiver may misunderstand content of received packets and perform improper operations, when the received packets are duplicated packets (e.g., duplicated information).

Figure 3:
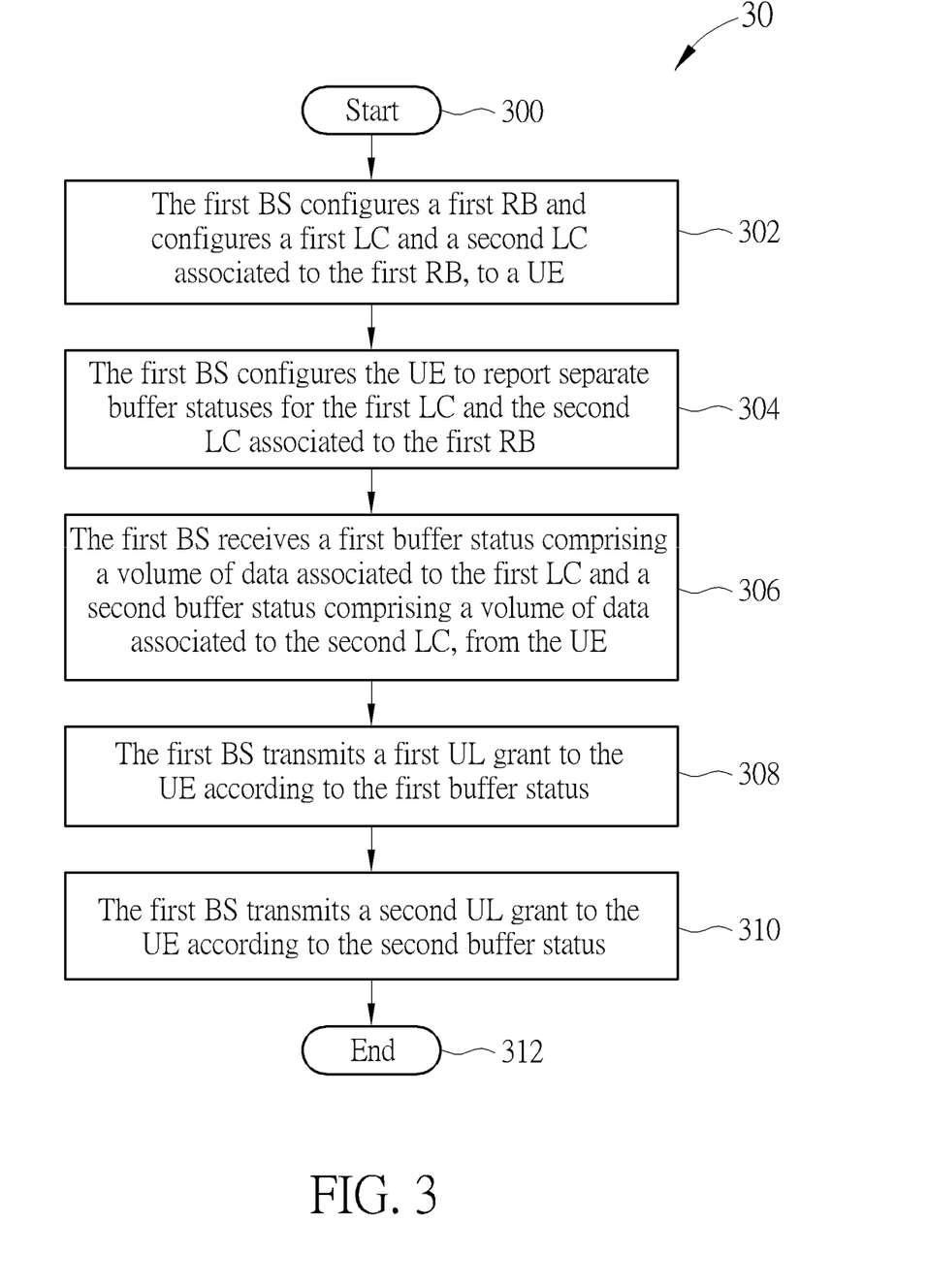
FIG. 3 is a flowchart of a process according to an example of the present invention.

A process 30 in FIG. 3 is utilized in a first BS in the network shown in FIG. 1, and includes the following steps:
Step 300: Start.
Step 302: The first BS configures a first RB and configures a first LC and a second LC associated to the first RB, to a UE.
Step 304: The first BS configures the UE to report separate buffer statuses for the first LC and the second LC associated to the first RB.
Step 306: The first BS receives a first buffer status comprising a volume of data associated to the first LC and a second buffer status comprising a volume of data associated to the second LC, from the UE.
Step 308: The first BS transmits a first UL grant to the UE according to the first buffer status.
Step 310: The first BS transmits a second UL grant to the UE according to the second buffer status.
Step 312: End.

Figure 4:
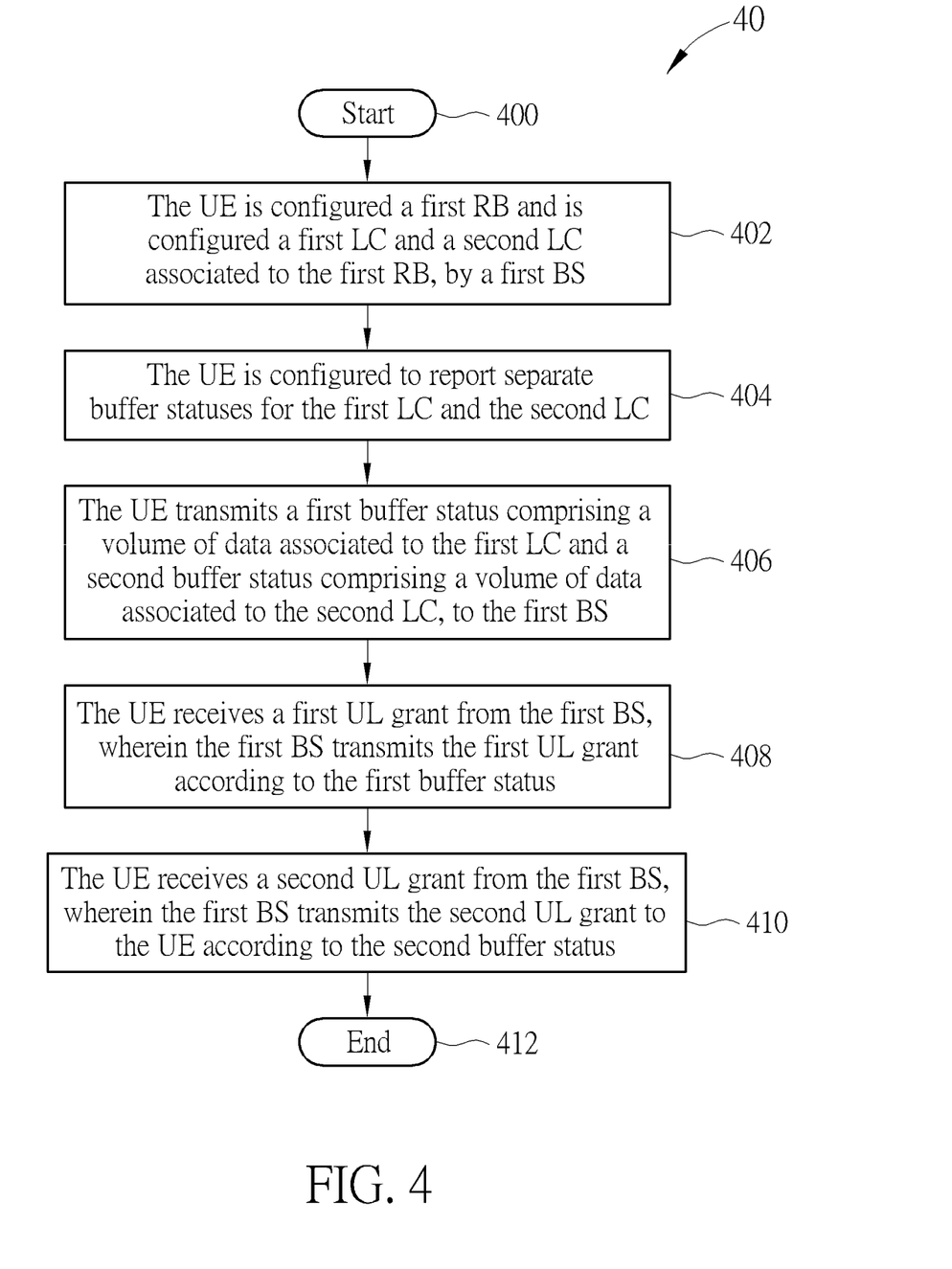
FIG. 4 is a flowchart of a process according to an example of the present invention.

A process 40 in FIG. 4 is utilized in a UE, and includes the following steps:
Step 400: Start.
Step 402: The UE is configured a first RB and is configured a first LC and a second LC associated to the first RB, by a first BS.
Step 404: The UE is configured to report separate buffer statuses for the first LC and the second LC.
Step 406: The UE transmits a first buffer status comprising a volume of data associated to the first LC and a second buffer status comprising a volume of data associated to the second LC, to the first BS.
Step 408: The UE receives a first UL grant from the first BS, wherein the first BS transmits the first UL grant according to the first buffer status.
Step 410: The UE receives a second UL grant from the first BS, wherein the first BS transmits the second UL grant to the UE according to the second buffer status.
Step 412: End.

In one example, the UE transmits at least one BSR including the first buffer status and the second buffer status, to the first BS. Each of the at least one BSR may be a MAC CE. In one example, a BSR of the at least one BSR includes a first LC identity (LCID) for indicating the first buffer status and a second LCID for indicating the second buffer status. In one example, the BSR may include a first identity (e.g., a first LCG identity) for indicating the first buffer status and a second identity (e.g., a second LCG identity) for indicating the second buffer status. In one example, the BSR does not include any identity for indicating the first buffer status and does not include any identity for indicating the second buffer status. Locations of the first buffer status and the second buffer status in the BSR are used for indicating or identifying the first buffer status and the second buffer status.

In one example, the first buffer status indicates a first buffer size comprising the volume of data associated to the first LC. The first buffer size may or may not include a volume of data associated to a third LC. In one example, the second buffer status indicates a second buffer size comprising the volume of data associated to the second LC. The second buffer size may or may not include a volume of data associated to a third LC. The first buffer size may not include the volume of data associated to the second LC, and the second buffer size may not include the volume of data associated to the first LC.

Figure 5:
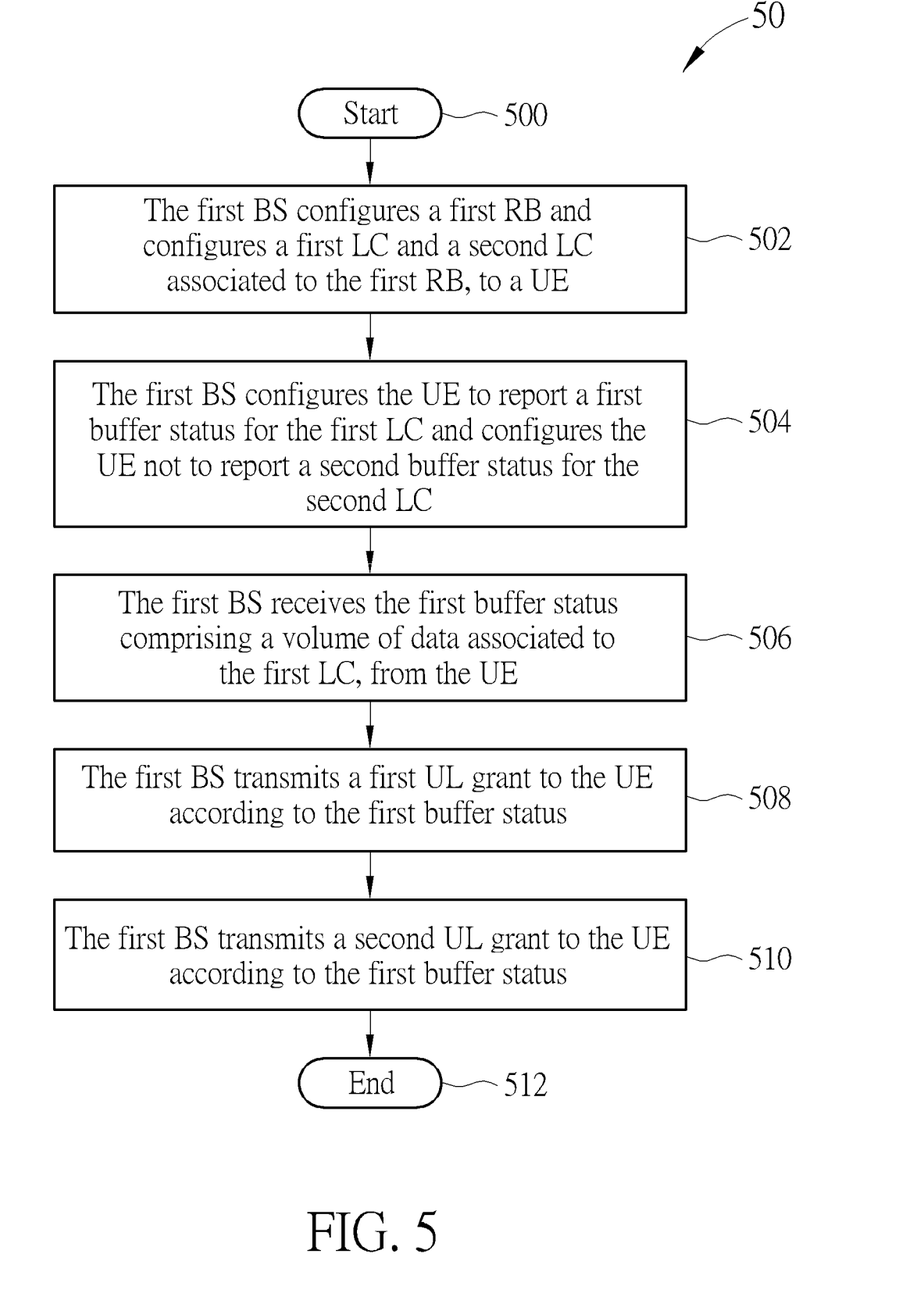
FIG. 5 is a flowchart of a process according to an example of the present invention.

A process 50 in FIG. 5 is utilized in a first BS in the network shown in FIG. 1, and includes the following steps:
Step 500: Start.
Step 502: The first BS configures a first RB and configures a first LC and a second LC associated to the first RB, to a UE.
Step 504: The first BS configures the UE to report a first buffer status for the first LC and configures the UE not to report a second buffer status for the second LC.
Step 506: The first BS receives the first buffer status comprising a volume of data associated to the first LC, from the UE.
Step 508: The first BS transmits a first UL grant to the UE according to the first buffer status.

Step 510: The first BS transmits a second UL grant to the UE according to the first buffer status.

Step 512: End.

According to the processes 30 and 50, a situation that the UE reports a joint buffer status of the first LC and the second LC to the first BS (e.g., the joint buffer status includes a sum of the volume of data of the first LC and the volume of data of the second LC) is avoided. The joint buffer status may make the first BS schedules an improper (e.g., excessive) number of UL grants for transmitting data of the first LC or data of the second LC since the first BS may think that each of the first LC and the second LC has the sum of the volume of data available for transmission. The following examples may be applied to the processes 30 and 50.

In one example, to transmit a first Packet Data Convergence Protocol (PDCP) PDU on the first RB twice, the UE generates a first Radio Link Control (RLC) PDU comprising the first PDCP PDU (e.g., RLC Service Data Unit (SDU)). The UE transmits the first RLC PDU via the first LC, and transmits the first RLC PDU via/using the second LC. The UE generates a first MAC PDU comprising the first RLC PDU and a first LCID, in response to the first UL grant, and generates a second MAC PDU comprising the first RLC PDU and a second LCID, in response to the second UL grant. The first MAC PDU may include a second RLC PDU from a third LC associated to a second RB or from the first LC or the second LC. The second RLC PDU may include a second PDCP PDU. The second RLC PDU may not include any PDCP PDU, e.g., the second RLC PDU is a RLC control PDU (e.g., RLC status PDU). The UE neither includes the first RLC PDU twice (e.g., "the first RLC PDU+the first LCID" and "the first RLC PDU+the second LCID") in the first MAC PDU nor includes the first RLC PDU twice in the second MAC PDU. Then, the UE transmits the first MAC PDU to the first BS and the second MAC PDU to the first BS, e.g., on different carriers. For example, the UE transmits the first MAC PDU on a first carrier according to the first UL grant and the second MAC PDU on a second carrier according to the second UL grant. Thus, possibility for the first BS to successfully receive the first RLC PDU is increased.

In one example, the first BS configures the UE to report a third buffer status for a third LC associated to a second RB. In one example, the first LC and the second LC may belong to a same LCG. In one example, the first LC and the second LC may belong to different LCGs. In one example, the first LC belongs to a LCG and the second LC does not belong to any LCG. In another example, the first LC and the second LC may not belong to any LCG.

In one example, the first BS transmits one or more RRC messages to the UE to configure the first RB, and the first LC and the second LC associated to the first RB, and to configure the UE to report the first buffer status for the first LC and not to report the second buffer status for the second LC. The one or more RRC messages may include a RB identity of the first RB, the first LCID and the second LCID. The one or more RRC messages may be RRC Connection Reconfiguration message(s), RRC Connection Setup message(s), RRC Connection Reestablishment message(s) and/or RRC Connection Resume message(s). In one example, the first BS transmits a first RB configuration to the UE, to configure the first RB and the first LC and the second LC associated to the first RB. The first RB configuration may include the RB identity of the first RB, the identity of the first LC and the identity of the second LC. The one or more RRC messages may include the first RB configuration to be transmitted to the UE.

In one example, when the UE receives the one or more RRC messages or the first RB configuration, the UE applies the one or more RRC messages or the first RB configuration by configuring the first RB and the first LC and the second LC associated to the first RB.

The first RB may be a signaling RB or a data RB. The second RB may be a signaling RB or a data RB.

Figure 6:
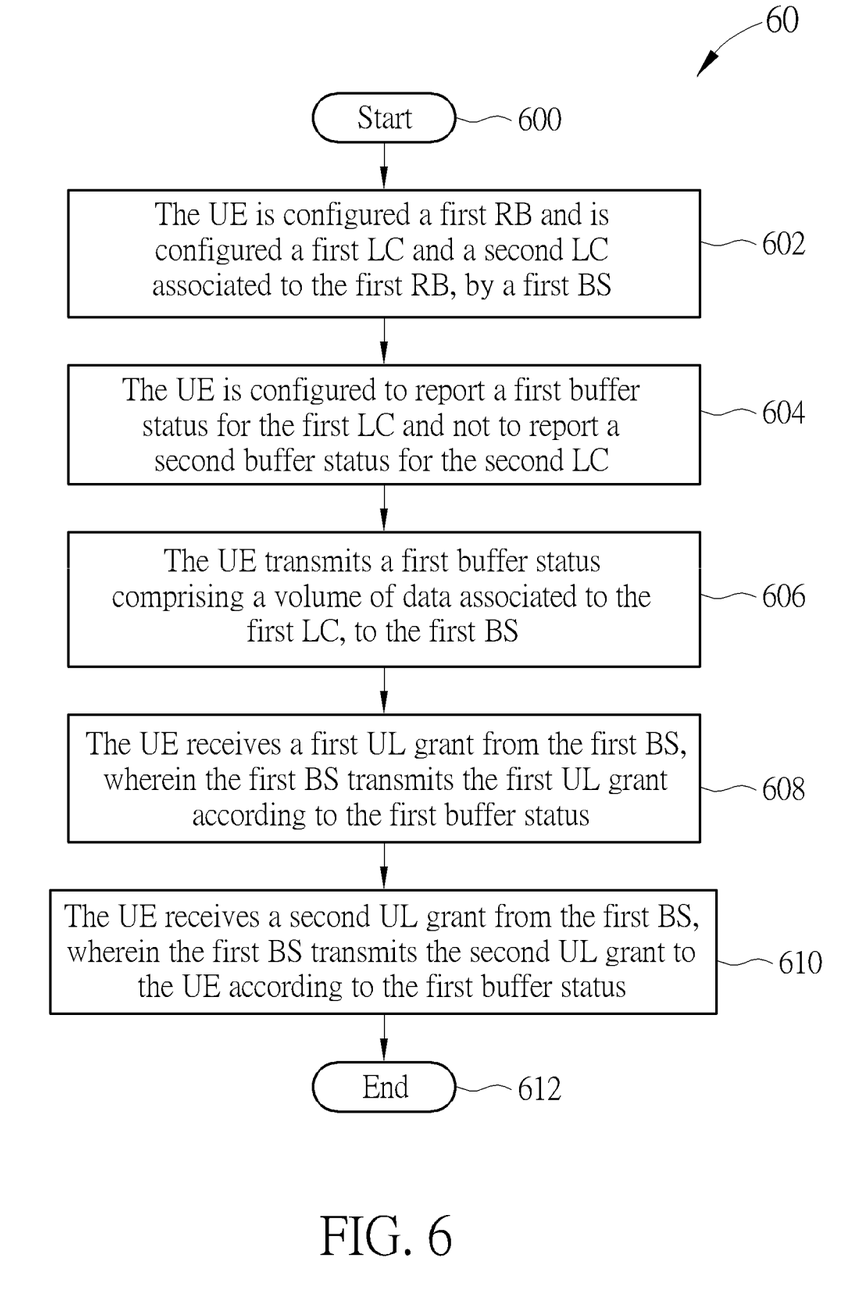
FIG. 6 is a flowchart of a process according to an example of the present invention.

A process 60 in FIG. 6 is utilized in a UE, and includes the following steps:

Step 600: Start.

Step 602: The UE is configured a first RB and is configured a first LC and a second LC associated to the first RB, by a first BS.

Step 604: The UE is configured to report a first buffer status for the first LC and not to report a second buffer status for the second LC.

Step 606: The UE transmits a first buffer status comprising a volume of data associated to the first LC, to the first BS.

Step 608: The UE receives a first UL grant from the first BS, wherein the first BS transmits the first UL grant according to the first buffer status.

Step 610: The UE receives a second UL grant from the first BS, wherein the first BS transmits the second UL grant to the UE according to the first buffer status.

Step 612: End.

In one example, when the UE is configured to report the first buffer status for the first LC and not to report the second buffer status for the second LC, the UE may trigger a BSR transmission due to data available for transmission for the first LC but not (e.g., never) trigger a BSR transmission due to data available for transmission for the second LC. In one example, the UE transmits a RLC control PDU associated to the first RB via the first LC instead of the second LC such that the RLC control PDU may trigger a BSR transmission.

In one example, the UE transmits a BSR including the first buffer status to the first BS. The BSR may be a MAC CE. In one example, the BSR may include a first LCID for indicating the first buffer status. In one example, the BSR may include a first identity (e.g., a first LCG identity) for indicating the first buffer status. In one example, the BSR may not include any identity for indicating the first buffer status. A location of the first buffer status in the BSR are used for indicating or identifying the first buffer status.

The first buffer status indicates a first buffer size comprising the volume of data associated to the first LC. The first buffer size does not include the volume of data associated to the second LC.

Figure 7:
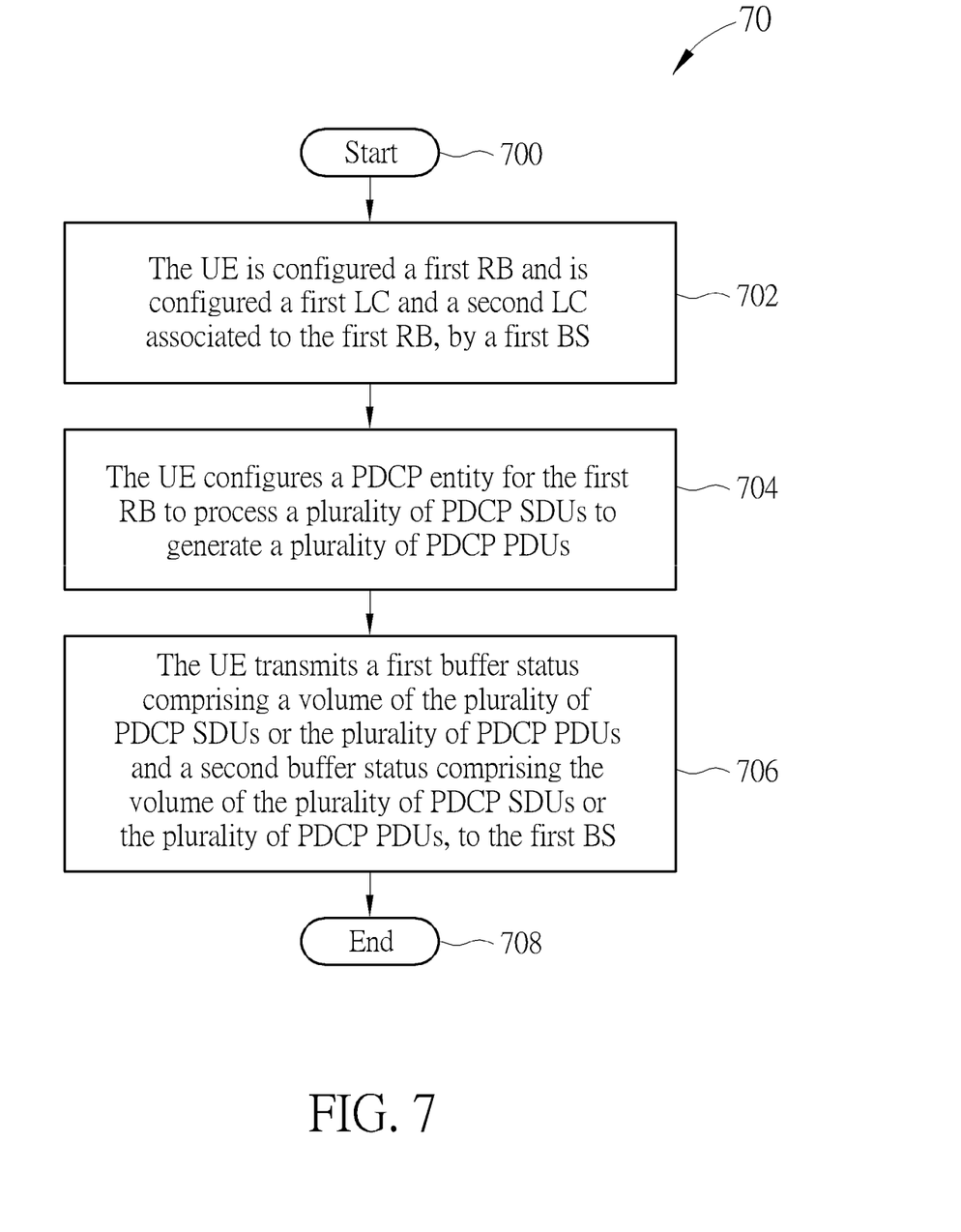
FIG. 7 is a flowchart of a process according to an example of the present invention.

A process 70 in FIG. 7 is utilized in a UE, and includes the following steps:

Step 700: Start.

Step 702: The UE is configured a first RB and is configured a first LC and a second LC associated to the first RB, by a first BS.

Step 704: The UE configures a PDCP entity for the first RB to process a plurality of PDCP SDUs to generate a plurality of PDCP PDUs.

Step 706: The UE transmits a first buffer status comprising a volume of the plurality of PDCP SDUs or the plurality of PDCP PDUs and a second buffer status comprising the volume of the plurality of PDCP SDUs or the plurality of PDCP PDUs, to the first BS.

Step 708: End.

In one example, the UE receives a first UL grant from the first BS on a first carrier, wherein the first BS transmits the first UL grant according to the first buffer status. The UE may receive a second UL grant from the first BS on a second carrier, wherein the first BS transmits the second UL grant to the UE according to the second buffer status. In one example, the first UL grant configures the UE to transmit a first transport block on a third carrier and the second UL grant configures the UE to transmit a second transport block on a fourth carrier.

In one example, the UE may be configured to report separate buffer statuses for the first LC and the second LC by the first BS. For example, the first BS (or a second BS) may transmit a RRC message (e.g. RRCConnectionReconfiguration message) configuring the UE to report the separate buffer statuses. The UE performs the step 706 in response to the RRC message.

In one example, the UE transmits a MAC PDU or a MAC CE comprising the first buffer status and the second buffer status to the first BS.

In one example, the UE triggers transmission of the first buffer status and the second buffer status, when the UE detects at least one of the plurality of PDCP SDUs coming into a buffer (e.g., PDCP buffer) or when the UE generates the plurality of PDCP PDUs in the buffer.

In one example, the UE may configure the PDCP entity according a PDCP configuration received from the first BS or a second BS.

In one example, the PDCP SDUs are IP packets or Service Data Adaption Protocol (SDAP) PDUs.

In one example of the process 70, the UE does not duplicate the plurality of PDCP SDUs and the plurality of PDCP PDUs in the PDCP entity in order to report the first buffer status and the second buffer status. That is, the UE determines the plurality of PDCP SDUs or the plurality of PDCP PDUs available for transmission for both the first LC and the second LC.

In one example, the UE determines the plurality of PDCP SDUs or the plurality of PDCP PDUs available for transmission for both the first LC and the second LC, when duplication is activated by the UE. Thus, the UE transmits the first buffer status and the second buffer status. The UE may activate the duplication, when receiving a duplication activation command (e.g., a PDCP control PDU or a MAC CE) from the first BS.

In one example, the UE may deactivate the duplication, when receiving a duplication deactivation command (e.g., a PDCP control PDU or a MAC CE) from the first BS. The UE may transmit the first buffer status but does not transmit the second buffer status in response to the deactivating. The UE may determine the plurality of PDCP SDUs or the plurality of PDCP PDUs available for transmission for only the first LC in response to the deactivating.

In one example, the UE is configured a first RB and is configured a first LC and a second LC associated to the first RB, by a first BS in a RRC message (e.g., RRCConnectionReconfiguration message) transmitted from the first BS to the UE.

The examples for the process 70 may be applied to other processes, and are not repeated herein.

Figure 8:
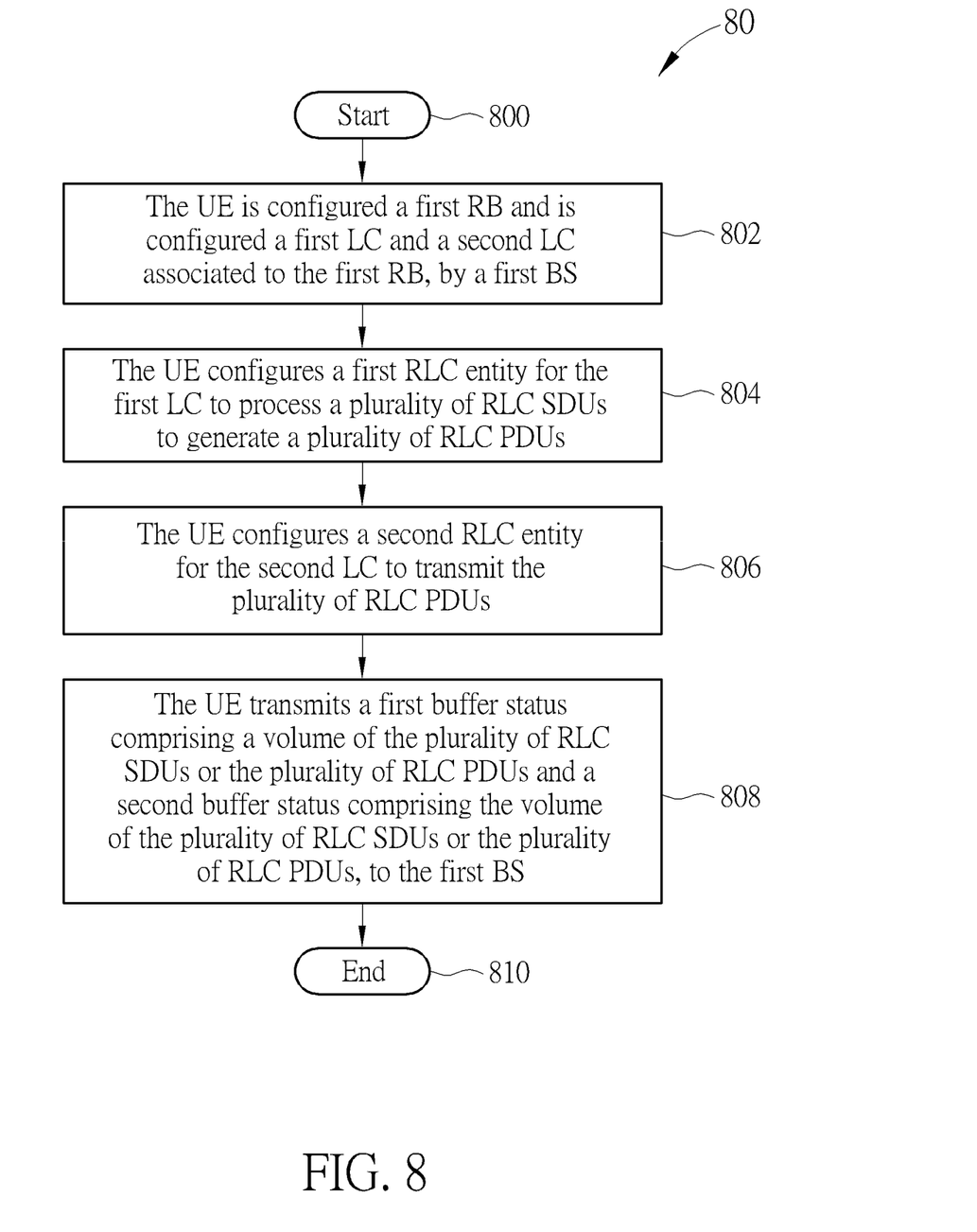
FIG. 8 is a flowchart of a process according to an example of the present invention.

A process 80 in FIG. 8 is utilized in a UE, and includes the following steps:

Step 800: Start.

Step 802: The UE is configured a first RB and is configured a first LC and a second LC associated to the first RB, by a first BS.

Step 804: The UE configures a first RLC entity for the first LC to process a plurality of RLC SDUs to generate a plurality of RLC PDUs.

Step 806: The UE configures a second RLC entity for the second LC to transmit the plurality of RLC PDUs.

Step 808: The UE transmits a first buffer status comprising a volume of the plurality of RLC SDUs or the plurality of RLC PDUs and a second buffer status comprising the volume of the plurality of RLC SDUs or the plurality of RLC PDUs, to the first BS.

Step 810: End.

Examples described for the above processes may be applied to the process 80, and are not repeated herein.

In one example, the UE triggers transmission of the first buffer status and the second buffer status, when the UE detects at least one of the plurality of RLC SDUs coming into a buffer (e.g., RLC buffer) or when the UE generates a plurality of PDCP PDUs in the buffer.

In one example, the UE may configure the first RLC entity according to a first RLC configuration received from the first BS or a second BS. The UE may configure the second RLC entity according to a second RLC configuration received from the first BS or a second BS. The first RLC configuration and the second RLC configuration may be a same configuration (i.e., same information element) or different configurations (i.e., different information elements).

In one example of the process 80, the UE does not duplicate the plurality of RLC SDUs and the plurality of RLC PDUs in the second RLC entity in order to report the first buffer status and the second buffer status. That is, the UE determines the plurality of RLC SDUs or the plurality of RLC PDUs available for transmission for both the first LC and the second LC.

In one example, the UE determines the plurality of RLC SDUs or the plurality of RLC PDUs available for transmission for both the first LC and the second LC, when duplication is activated by the UE. Thus, the UE transmits the first buffer status and the second buffer status. The UE may activate the duplication, when receiving a duplication activation command (e.g., a PDCP control PDU or a MAC CE) from the first BS.

In one example, the UE may deactivate the duplication, when receiving a duplication deactivation command (e.g., a PDCP control PDU or a MAC CE) from the first BS. The UE may determine the plurality of RLC SDUs or the plurality of RLC PDUs available for transmission for only the first LC in response to the deactivating. The UE may transmit the first buffer status but does not transmit the second buffer status.

Figure 9:
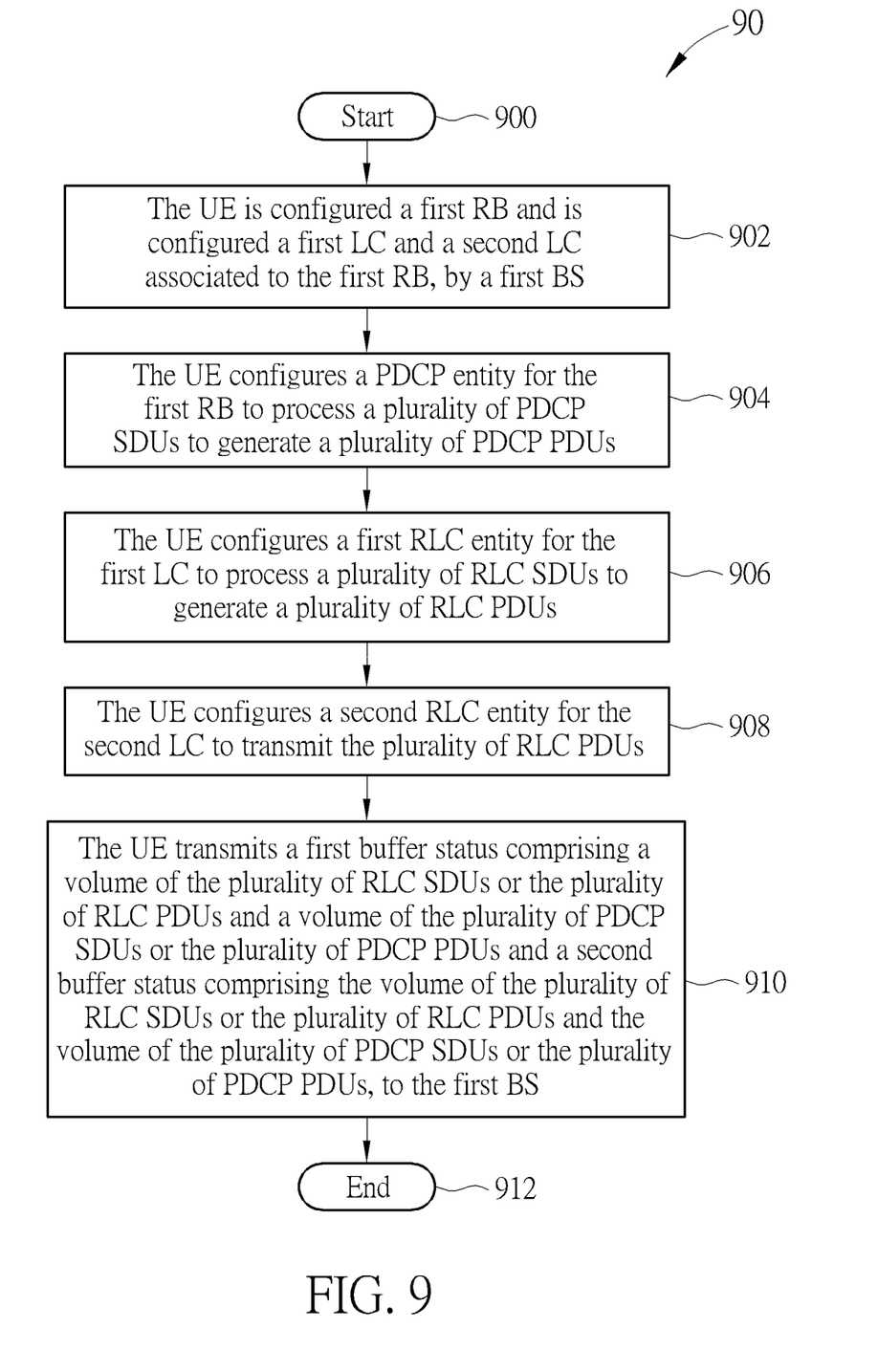
FIG. 9 is a flowchart of a process according to an example of the present invention.

A process 90 in FIG. 9 is utilized in a UE, and includes the following steps:

Step 900: Start.

Step 902: The UE is configured a first RB and is configured a first LC and a second LC associated to the first RB, by a first BS.

Step 904: The UE configures a PDCP entity for the first RB to process a plurality of PDCP SDUs to generate a plurality of PDCP PDUs.

Step 906: The UE configures a first RLC entity for the first LC to process a plurality of RLC SDUs to generate a plurality of RLC PDUs.

Step 908: The UE configures a second RLC entity for the second LC to transmit the plurality of RLC PDUs.

Step 910: The UE transmits a first buffer status comprising a volume of the plurality of RLC SDUs or the plurality of RLC PDUs and a volume of the plurality of PDCP SDUs or the plurality of PDCP PDUs and a second buffer status comprising the volume of the plurality of RLC SDUs or the plurality of RLC PDUs and the volume of the plurality of PDCP SDUs or the plurality of PDCP PDUs, to the first BS.

Step 912: End.

The process 90 may be seen as a combination of the processes 70 and 80. Examples described for the processes above may be applied to the process 90, and are not repeated herein.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling buffer status reporting for packet duplication. Thus, the problem that a receiver may misunderstand content of duplicated packets received from a transmitter and perform improper operations is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling buffer status reporting for data duplication, comprising:
    a storage device; and
    a processing circuit, coupled to the storage device, wherein the storage device stores, and the processing circuit is configured to execute instructions of:
    being configured a first radio bearer (RB) and being configured a first logical channel (LC) and a second LC associated to the first RB, by a first base station (BS);
    being configured to report separate buffer statuses for the first LC and the second LC;
    transmitting a first buffer status comprising a volume of data associated to the first LC and a second buffer status comprising a volume of data associated to the second LC, to the first BS;
    receiving a first UL grant from the first BS, wherein the first BS transmits the first UL grant according to the first buffer status;
    receiving a second UL grant from the first BS, wherein the first BS transmits the second UL grant to the communication device according to the second buffer status;
    configuring a first radio link control (RLC) entity for the first LC to process a plurality of RLC service data units (SDUs) to generate a plurality of RLC Protocol Data Units (PDUs); and
    configuring a second RLC entity for the second LC to transmit the plurality of RLC PDUs;
    wherein the volume of data comprises a volume of the plurality of RLC SDUs or the plurality of RLC PDUs and the second buffer status comprises the volume of the plurality of RLC SDUs or the plurality of RLC PDUs.

2. The communication device of claim 1, wherein the communication device transmits a buffer status report (BSR) comprising the first buffer status and the second buffer status to the first BS, and the BSR comprises a first identity for indicating the first buffer status and a second identity for indicating the second buffer status.

3. The communication device of claim 1, wherein locations of the first buffer status and the second buffer status indicate the first buffer status and the second buffer status.

4. The communication device of claim 1, wherein the instructions further comprise:
    configuring a Packet Data Convergence Protocol (PDCP) entity for the first RB to process a plurality of PDCP SDU to generate a plurality of PDCP PDUs;
    wherein the volume of data comprises a volume of the plurality of PDCP SDUs or the plurality of PDCP PDUs and the second buffer status comprises the volume of the plurality of PDCP SDUs or the plurality of PDCP PDUs.

5. The communication device of claim 4, wherein the communication device triggers the transmission of the first buffer status and the second buffer status, when the communication device detects at least one of the plurality of PDCP SDUs coming into a buffer or when the communication device generates the plurality of PDCP PDUs in the buffer.

6. The communication device of claim 1, wherein the first buffer status and the second buffer status are transmitted in a medium access control (MAC) PDU or a MAC control element (CE) to the first BS.

7. The communication device of claim 1, wherein the communication device triggers the transmission of the first buffer status and the second buffer status, when the communication device detects at least one of the plurality of RLC SDUs coming into a buffer or when the communication device generates the plurality of RLC PDUs in the buffer.

8. A base station (BS) for handling buffer status reporting for data duplication, comprising:
    a storage device; and
    a processing circuit, coupled to the storage device, wherein the storage device stores, and the processing circuit is configured to execute instructions of:
    configuring a radio bearer (RB) and configuring a first logical channel (LC) and a second LC associated to the RB, to a communication device;
    configuring the communication device to report a first buffer status for the first LC and configuring the communication device not to report a second buffer status for the second LC;
    receiving the first buffer status comprising a volume of data associated to the first LC, from the communication device;
    transmitting a first UL grant to the communication device according to the first buffer status; and
    transmitting a second UL grant to the communication device according to the first buffer status.

9. The BS of claim 8, wherein the first LC and the second LC belong to a same LC group (LCG) or different LCGs.

10. The BS of claim 8, wherein the BS configures the RB and configures the first LC and the second LC associated to the RB by transmitting at least one radio resource control (RRC) message to the communication device.

11. The BS of claim 10, wherein the at least one RRC message comprises a RB configuration for configuring the RB and for configuring the first LC and the second LC associated to the RB.

* * * * *